Patented Aug. 2, 1927.

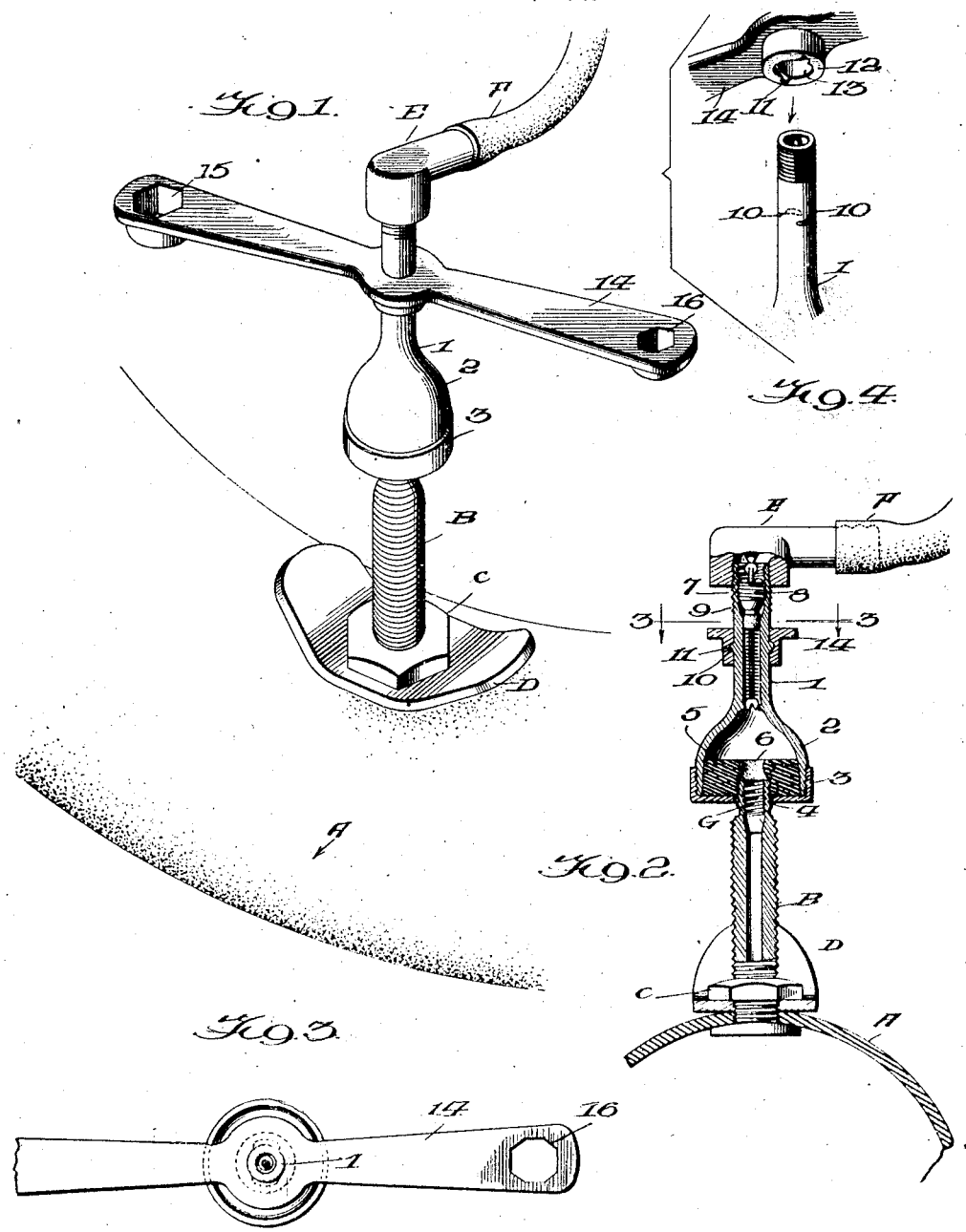

1,637,499

UNITED STATES PATENT OFFICE.

GEORGE W. RUNDLETT, OF WASHINGTON, DISTRICT OF COLUMBIA.

TEMPORARY TIRE-TUBE VALVE.

Application filed December 15, 1925. Serial No. 75,535.

My invention relates to temporary valves for use in the course of repairing and the testing of inner tubes of pneumatic vehicle tires.

The object of the invention is to provide a temporary tire tube valve, together with a handle therefor, for use by persons engaged in repairing and testing tire inner tubes, and to so construct said temporary valve that it may be applied and detached during use, without difficulty.

As is well known, inner tubes for pneumatic vehicle tires are provided with inflating valves, to retain air pressure therein. These valves are generally screw-threaded into the valve stems of said inner tubes and are detachable therefrom by unscrewing the same from the stem. These valves are ordinarily provided with an upwardly extending spring pressed plunger, which is adapted to be depressed for the purpose of unseating the valve proper, to deflate the air pressure in the inner tube.

It is the usual procedure that where a vehicle owner notices that one of his vehicle tires does not retain air pressure, to have the demountable rim, including the inner tube and casing, removed from the wheel. The person repairing the tube will then demount the tire, and for so doing, must deflate the tube. This deflation may be done by depressing the spring pressed valve plunger, which will allow the air pressure contained in the tube to escape. Such an operation takes several minutes, during which time the plunger must be kept constantly depressed.

On account of this time delay, it is customary for repairmen to entirely remove the valve from valve stem, whereof the contained air pressure escapes in a much shorter period than can be accomplished by depressing the valve plunger.

After the inner tube has been removed from the casing, the valve is replaced in the valve stem, air pressure applied, and the tube inflated. The inflated tube is then immerged in a water trough and the leak therein ascertained by the bubbles of air escaping through the water.

When the leak has been thus ascertained, the valve is again removed from the valve stem and the tube totally deflated, after which the leak is closed by suitable patching or by vulcanizing.

When the tube has been repaired, it is necessary to again screw the valve into the stem, inflate the tube, and again immerge the same in the water trough, to ascertain whether or not the patch or vulcanization has effectively closed off the leak and rendered the tube air tight.

If it is found that the patch or vulcanization has successfully sealed the tube, the valve is again removed, the tire casing, rim, and tube assembled. the tube valve replaced, and the tube inflated to proper pressure.

Thus it will be seen that during the course of demounting, repairing and reassembling a vehicle tire inner tube that the valve must be removed and replaced a number of times. This operation requires considerable time and it is this problem that has inspired my invention.

My invention eliminates the constant removing and and replacing of the tube valve; the valve being only removed when the tire is demounted and replaced when the tire is reassembled.

With the foregoing objects and general information in mind, I will now specifically describe my invention.

In the drawings—

Figure 1 is a complete view of my improved temporary tire tube valve when in use;

Figure 2 is a sectional view of my device, disclosing its mechanism and means of attachment;

Figure 3 is a section taken on line 3—3 of Fig. 2 of the device; while Figure 4 is a detail view showing the means of attachment of the handle of my temporary valve.

In the drawings, A is an inner tube provided with a valve stem B, said stem being attached to the tube by the screw nut C and bent plate D. It is customary to screw an air valve (not shown) into the interiorly threaded portion G of the stem B. The valve so positioned, is the means for retaining air pressure within the tube and is the valve spoken of at length in the foregoing paragraphs. All of this construction being conventional.

My temporary valve consists of a tubular stem portion 1, having its lower end 2 flared to a greater diameter. Exteriorly screw-threaded to the flared portion 2, is cover plate 3, having an aperture 4 therein, said aperture being of slightly greater diameter than the diameter of the upper portion of valve stem B.

Retained in the flared bottom 2, by friction on the sloping sides thereof, is a thick resilient washer 5, having a hole 6 therethrough of slightly less diameter than the upper portion of valve stem B.

The exterior of the upper portion of my temporary valve is circumferentially ridged as at 9, to provide a frictional engagement with a conventional inflating nozzle E. The inflating nozzle E is attached by flexible tubing F to any suitable source of compressed air, the nozzle being adapted to slip over the upper end of my temporary valve for the purpose of forcing air therethrough. Interiorly screwthreaded, at 7, is a conventional "Schrader" inflating or air check valve 8.

About midway down on the stem 1 are formed the interrupted threads 10. These threads 10 are engaged by the grooves 11 formed in the interior of opening 13 in the depending annular member 12 of the handle 14. This handle 14 is adapted to slip over the stem 1 and be fastened thereon by the interrupted threads 10 and grooves 11.

On each side of the handle 14 are hexagonal openings 15 and 16 which form socket wrenches for applying and removing nuts from the clamping plates of the inner tubes.

Having thus described my temporary tube valve in detail, I will now describe its operation and uses.

When a tire is to be repaired, the valve is initially removed, the tube deflated, and the tube removed from the casing. During the several steps of repair and testing, as before described, my valve is used by merely attaching or detaching it from the tube valve stem, the temporary valve being retained on the valve stem by the resilient washer. Air pressure is applied from the inflating nozzle and the tire tube, minus its original valve, inflated, the air check or inflating valve proper of the temporary valve retaining the pressure. If it is desired to deflate the tube, my temporary valve as a whole is merely lifted from the tire valve stem and the air quickly escapes. After repair and test, the original valve is replaced, the tire, tube and rim assembled and placed on the vehicle wheel.

The handle member illustrated forms a convenient means for applying and removing the temporary valve from the tire tube stem. As is obvious, the handle may be detached or attached from the temporary valve by a quarter turn thereof when the interrupted threads and grooves are registered.

It will be plain that by eliminating the tedious holding down of the tube valve plunger for deflating, or the series of removals and replacements of the tube valve during repair and testing, by using my temporary valve, a considerable saving of time and labor is accomplished, as my valve being readily slipped over or pulled from the tube valve stem and holding itself in place during testing when air is placed in the tube, and requires no screwing or unscrewing for attachment or displacement.

What I claim and desire to secure by Letters Patent of the United States, is:—

A temporary valve comprising a tubular casing, said casing being flared outwardly at its lower end, said lower end having screw threads over a portion of its surface, a cover plate screw-threaded interiorly to engage with the screw threads on the lower end of the casing, said cover plate being further provided with an aperture thru the center thereof, a resilient washer retained in the flared portion of said casing and having an aperture adapted to coincide with the aperture in the cover plate, an air valve mounted in the upper portion of said casing, and a cross handle bar for manipulation of the device.

In testimony whereof I affix my signature.

GEORGE W. RUNDLETT.